United States Patent
Hashizume

(10) Patent No.: US 9,871,943 B1
(45) Date of Patent: Jan. 16, 2018

(54) IMAGE FORMING APPARATUS AND IMAGE FORMING SYSTEM CAPABLE OF FORMING AN IMAGE WITH AN INVISIBLE IMAGE FORMING MATERIAL

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Yusuke Hashizume, Urayasu Chiba (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/256,830

(22) Filed: Sep. 6, 2016

(51) Int. Cl.
*H04N 1/40* (2006.01)
*H04N 1/32* (2006.01)
*H04N 1/00* (2006.01)

(52) U.S. Cl.
CPC ....... *H04N 1/32192* (2013.01); *H04N 1/0087* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,208,157 B2 * | 6/2012 | Kaneko | G06F 21/31 235/494 |
| 8,304,042 B2 | 11/2012 | Ito et al. | |
| 2006/0279751 A1 * | 12/2006 | Onishi | G03G 15/0115 358/1.8 |
| 2008/0285070 A1 * | 11/2008 | Takeuchi | G06F 3/03545 358/1.15 |
| 2009/0237756 A1 * | 9/2009 | Hirokawa | H04N 1/46 358/518 |
| 2011/0170145 A1 * | 7/2011 | Govyadinov | G06F 17/241 358/3.28 |

* cited by examiner

*Primary Examiner* — Thomas D Lee
(74) *Attorney, Agent, or Firm* — Amin, Turocy & Watson LLP; Gregory Turocy

(57) ABSTRACT

In accordance with an embodiment, an image forming apparatus comprises a first image forming section configured to form an image with a visible image forming material; a second image forming section configured to form an image with an invisible image forming material; an image acquisition section configured to acquire a print image that should be printed on a medium as a printed matter; and a processor configured to acquire authentication information for authenticity determination added to the printed matter and carry out an image forming processing on not only the print image with the visible image forming material by the first image forming section but also the authentication information with the invisible image forming material by the second image forming section.

14 Claims, 6 Drawing Sheets

IMAGE FORMING APPARATUS AND IMAGE FORMING SYSTEM CAPABLE OF FORMING AN IMAGE WITH AN INVISIBLE IMAGE FORMING MATERIAL

FIELD

Embodiments described herein relate generally to an image forming apparatus and an image forming system.

BACKGROUND

There is a method that creates a printed matter obtained by printing an image on a sheet having a duplication preventing function or attaches a seal to a printed matter for forgery prevention in order to prevent unfair duplication or forgery of a printed matter. However, in such a method, the cost of the sheet having the duplication preventing function or the seal for forgery prevention is too high.

Furthermore, there is also a technology (ground tint printing) that prints an image embedded with a character string as a background which appears if copied as a duplication prevention technology of a printed matter. However, in the ground tint printing, there is a problem that small characters are not seen or the background becomes an obstacle.

DETAILED DESCRIPTION

In accordance with an embodiment, an image forming apparatus comprises a first image forming section, a second image forming section, an image acquisition section and a processor. The first image forming section forms an image with a visible image forming material. The second image forming section forms an image with an invisible image forming material. The image acquisition section acquires a print image that should be printed on a medium as a printed matter. The processor acquires authentication information for authenticity determination added to the printed matter and carries out an image forming processing on not only the print image with the visible image forming material by the first image forming section but also the authentication information with the invisible image forming material by the second image forming section. Furthermore, the processor can carry out simultaneously or in sequence the image forming processing on the print image with the visible image forming material by the first image forming section and the authentication information with the invisible image forming material by the second image forming section.

In accordance with another embodiment, an image forming method involves forming an image with a visible image forming material; forming an image with an invisible image forming material; acquiring a print image that should be printed on a medium as a printed matter; acquiring authentication information for authenticity determination added to the printed matter; and carrying out an image forming processing on the print image with the visible image forming material and the authentication information with the invisible image forming material.

Hereinafter, the embodiment is described with reference to the accompanying drawings.

Figure 1:
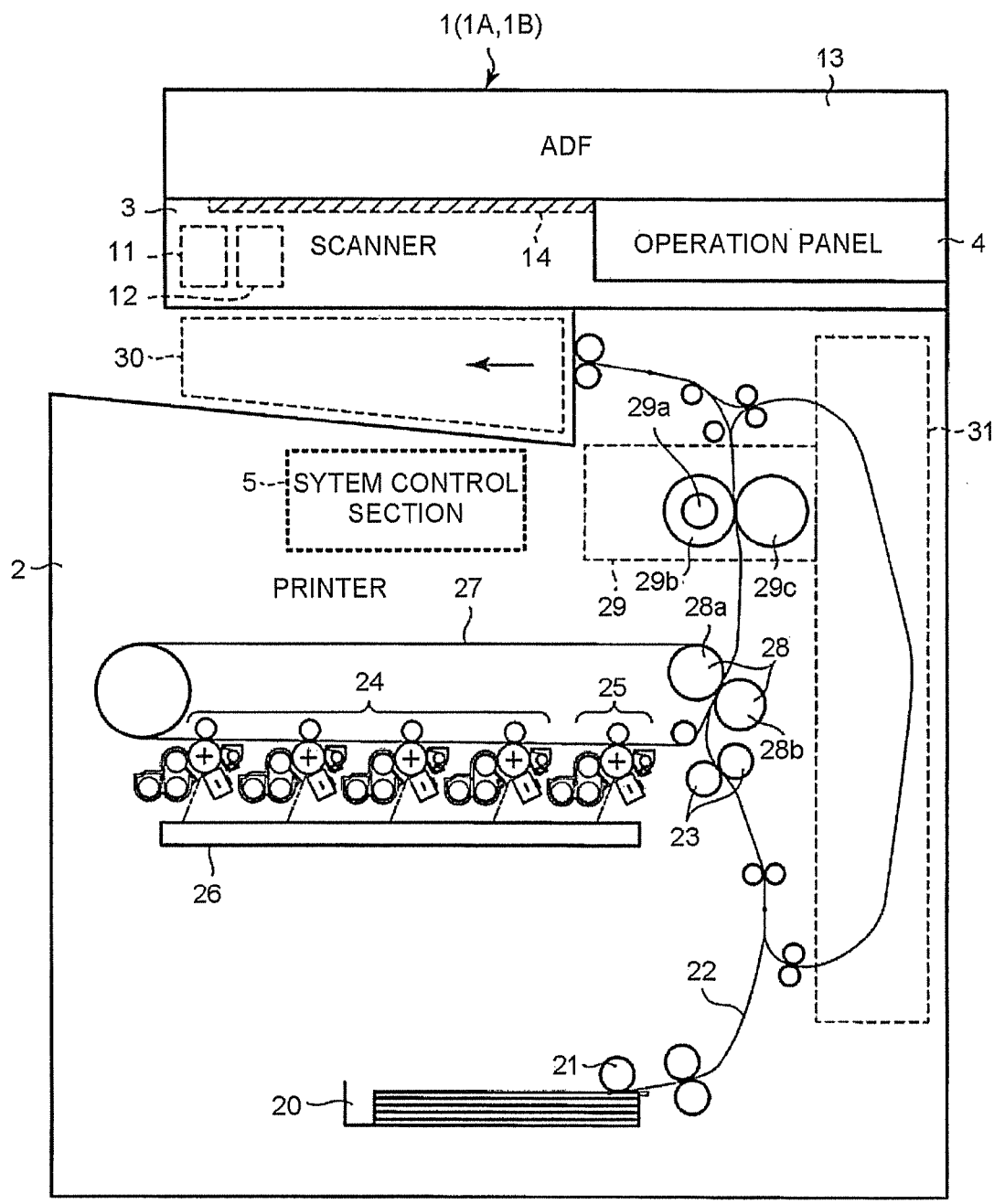
FIG. 1 is a cross-sectional view schematically illustrating an example of the configuration of a digital multi-functional peripheral according to an embodiment.

FIG. 1 is a diagram schematically illustrating an example of the configuration of a digital multi-functional peripheral as an image forming apparatus according to the embodiment. The digital multi-functional peripheral (MFP) 1 according to the present embodiment functions as the image forming apparatus which forms a printed matter such as a prescription slip. As shown in FIG. 1, the digital MFP 1 includes a printer 2, a scanner 3, an operation panel 4 and a system control section 5.

The scanner 3 reads an image of a document to convert the read image to image data. In the example of the configuration shown in FIG. 1, the scanner 3 is arranged on the upper part of the main body of the digital MFP. The scanner 3 includes a first reading section 11, a second reading section 12, an ADF (Auto Document Feeder) 13 and a document table glass 14. The scanner 3 has a function of reading an image of a document conveyed by the ADF 13 with the first reading section 11 or the second reading section 12 and a function of scanning the document placed on the document table glass 14.

The first reading section 11 is a scanner for reading an image (visible image) of a document with normal visible light. In one embodiment, visible light has a wavelength from 400 nm to 700 nm. The first reading section 11 includes an illumination section for emitting the visible light to the document and a photoelectric conversion section for reading the visible light from a document surface as the image data. The first reading section 11 reads the image of the document conveyed by the ADF 13 at a predetermined document reading position. Further, the first reading section 11 enables the reading position to move along the document table glass 14 through a movement mechanism to scan the image on the surface of the document placed on the document table glass 14. The first reading section 11 also functions as an image acquisition section for acquiring the image of the document as information (a print image) which should be printed on a medium as the visible image.

The second reading section 12 is a scanner for reading an invisible image formed on the document surface with invisible light such as UV rays. In one embodiment, UV light has a wavelength from 10 nm to 380 nm. For example, the second reading section 12 is an UV scanner for emitting UV (ultraviolet) rays as the invisible light and reading a fluorescence image capable of being read with the emitted UV rays. In the present embodiment, it is described that the second reading section 12 is assumed as the UV scanner for reading the image formed with UV toner described later. The second reading section 12 as the UV scanner includes an illumination section for emitting the UV rays and a photoelectric conversion section for reading the fluorescence image capable of being read with the UV rays. However, the second reading section 12 as the UV scanner is constituted in such a manner that the UV rays as the invisible light are not emitted to the outside of the apparatus.

The second reading section 12 reads the image on the surface of the document conveyed by the ADF 13 at a predetermined document reading position in a case of reading the document conveyed by the ADF 13. Thus, the second reading section 12 is constituted in such a manner that the UV rays emitted by the illumination section at a reading position are not emitted to the outside of the apparatus. Further, the second reading section 12 enables the reading position to move along the document table glass 14 through a movement mechanism to scan the image on the surface of the document placed on the document table glass 14. The second reading section 12 reads the fluorescence image in a state in which a cover (ADF 13) of the document table glass 14 is being closed so that the UV rays through the document table glass 14 are not emitted to the outside of the apparatus.

The ADF 13 conveys the documents one by one to a predetermined sheet feed position. The ADF 13 conveys the document in such a manner that the document surface passes through the document reading position of the first reading section 11 and the document reading position of the second reading section 12. The document reading position of the first reading section 11 and the document reading position of the second reading section 12 may be identical to or different from each other. The first reading section 11 may set a position of reading a first surface (for example, surface) of the document as the document reading position, and the second reading section 12 may set a position of reading a second surface (for example, back surface) of the document as the document reading position. Furthermore, the document is placed on the document table glass 14. In a case in which the document is placed on the document table glass 14, the ADF 13 functions as the cover against the document table glass 14. In this case, the ADF 13 as the cover also functions as a device for shielding the light emitted by the first reading section or the second reading section to the document table glass (document).

Next, the printer 2 is described.

The printer 2 functions as the image forming apparatus. The printer 2 includes a first image forming section and a second image forming section. The first image forming section forms a visible image capable of being read with the normal visible light. For example, the first image forming section forms the visible image on a sheet with a black or colored image forming material (YMCK toner). The second image forming section forms an invisible image which cannot be recognized with human eyes. The invisible image formed by the second image forming section is an image which can be recognized (read) with eyes with specific invisible light (for example, UV rays). For example, the second image forming section forms the invisible image on the sheet with the UV toner as an image forming material which can be recognized with eyes through irradiation of the invisible light.

In the example of the configuration shown in FIG. 1, the printer 2 includes a sheet feed cassette 20. For example, the sheet feed cassette 20 is detachably arranged at the lower part of the main body of the digital MFP. The sheet feed cassette 20 stores a sheet as an image forming medium on which an image is formed. The sheet feed cassette 20 includes a pickup roller 21. The pickup roller 21 picks up sheets one by one from the sheet feed cassette 20. The pickup roller 21 supplies the picked up sheet to a conveyance path (conveyance section) 22 composed of a plurality of conveyance rollers. The number of the sheet feed cassettes and that of the pickup rollers constituting a sheet feed section are not limited to one. For example, the sheet feed section may include a plurality of sheet feed cassettes and pickup rollers or a manual feed tray. The conveyance section 22 conveys the sheet supplied by the pickup roller 21 to a resist roller 23. The resist roller 23 conveys the sheet to a transfer position at a timing at which the image is transferred.

The printer 2 includes a first image forming section 24 and a second image forming section 25. The first image forming section 24 forms an image with the visible image forming material. The first image forming section 24 may form a monochrome image or a color image. The second image forming section 25 forms an image with the invisible image forming material. In the present embodiment, the first image forming section 24 forms the image with the YMCK toner (each toner of yellow (Y) toner, magenta (M) toner, cyan (C) toner and black (K) toner). In this case, the first image forming section 24 includes a photoconductive drum as an image carrier for the toner of each color (Y, M, C and K). Further, in the present embodiment, the second image forming section 25 forms an image with the UV toner capable of being recognized with eyes with the UV rays. An electrostatic latent image is formed on each of the photoconductive drums of the first image forming section 24 and the second image forming section 25 with laser light from an exposure section 26. The exposure section 26 emits the laser light controlled by the system control section 5 to the photoconductive drum via an optical system such as a polygon mirror.

The first image forming section 24 forms a visible toner image by developing the electrostatic latent image formed on each of the photoconductive drums with each toner of Y toner, M toner, C toner and K toner. The second image forming section 25 forms an invisible toner image by developing the electrostatic latent image formed on the photoconductive drum with the UV toner. An intermediate transfer belt 27 is an intermediate transfer body. The first image forming section 24 and the second image forming section 25 transfer (primarily transfer) the toner image formed on each of the photoconductive drums onto the intermediate transfer belt 27. In a case in which the visible image and the invisible image are printed on one medium (sheet), the first image forming section 24 and the second image forming section 25 transfer each toner image of the YMCK and the UV toner image onto the intermediate transfer belt 27 in an overlapped manner. In this way, the intermediate transfer belt 27 holds an image obtained by overlapping the toner image with the toner of each color of the YMCK and the toner image with the UV toner.

A transfer section 28 transfers the toner image on the intermediate transfer belt 27 onto the sheet at a secondary transfer position. The secondary transfer position is a position at which the toner image on the intermediate transfer belt 27 is transferred onto the sheet. The secondary transfer position is a position at which a support roller 28a faces a secondary transfer roller 28b. The resist roller 23 conveys the sheet to the secondary transfer position in accordance with a timing at which the toner image on the intermediate transfer belt 27 is conveyed to the secondary transfer position. The transfer section 28 supplies the sheet onto which the toner image is transferred at the secondary transfer position to a fixing section 29.

The fixing section (fixing device) 29 fixes the toner image on the sheet. In the example of the configuration shown in FIG. 1, the fixing section 29 includes a heat roller 29b in which a heating section 29a is built and a pressurization section 29c contacting with the heat roller 29b in a pressurized state. The heating section 29a, for example, may be composed of a heater lamp such as a halogen lamp or may be a heater with an inductive heating (IH) system. Further, the heating section 29a may be composed of a plurality of heaters. The heating section 29a heats the heat roller 29b to a fixing temperature. The fixing section 29 pressurizes the sheet onto which the toner image is transferred by the transfer section 28 and heats the sheet at the fixing temperature. In this way, the fixing section 29 fixes the toner image on the sheet.

The sheet on which the fixing section 29 carries out a fixing processing is conveyed to either a sheet discharge section 30 or an automatic duplex unit 31 through a conveyance mechanism. For example, in a case of forming an image on the back surface of the sheet to which the fixing processing is carried out, the conveyance mechanism switches back the sheet to convey the sheet to the ADU 31 after temporarily conveying the sheet to the sheet discharge section 30 side. The ADU 31 supplies the sheet in a state in which two sides thereof are inverted through switchback to the front of the resist roller 23 again. Further, in a case of discharging a sheet on which the fixing section 29 carries out the fixing processing, the conveyance mechanism conveys the sheet to the sheet discharge section 30 side to discharge the sheet to the sheet discharge section 30.

The operation panel 4 is a user interface. The operation panel 4 is controlled by the system control section 5. The operation panel 4 outputs information input by a user to the system control section 5. The user designates an operation mode on the operation panel 4 or inputs information such as setting information.

Next, the configuration of a control system of the digital MFP is described.

Figure 2:
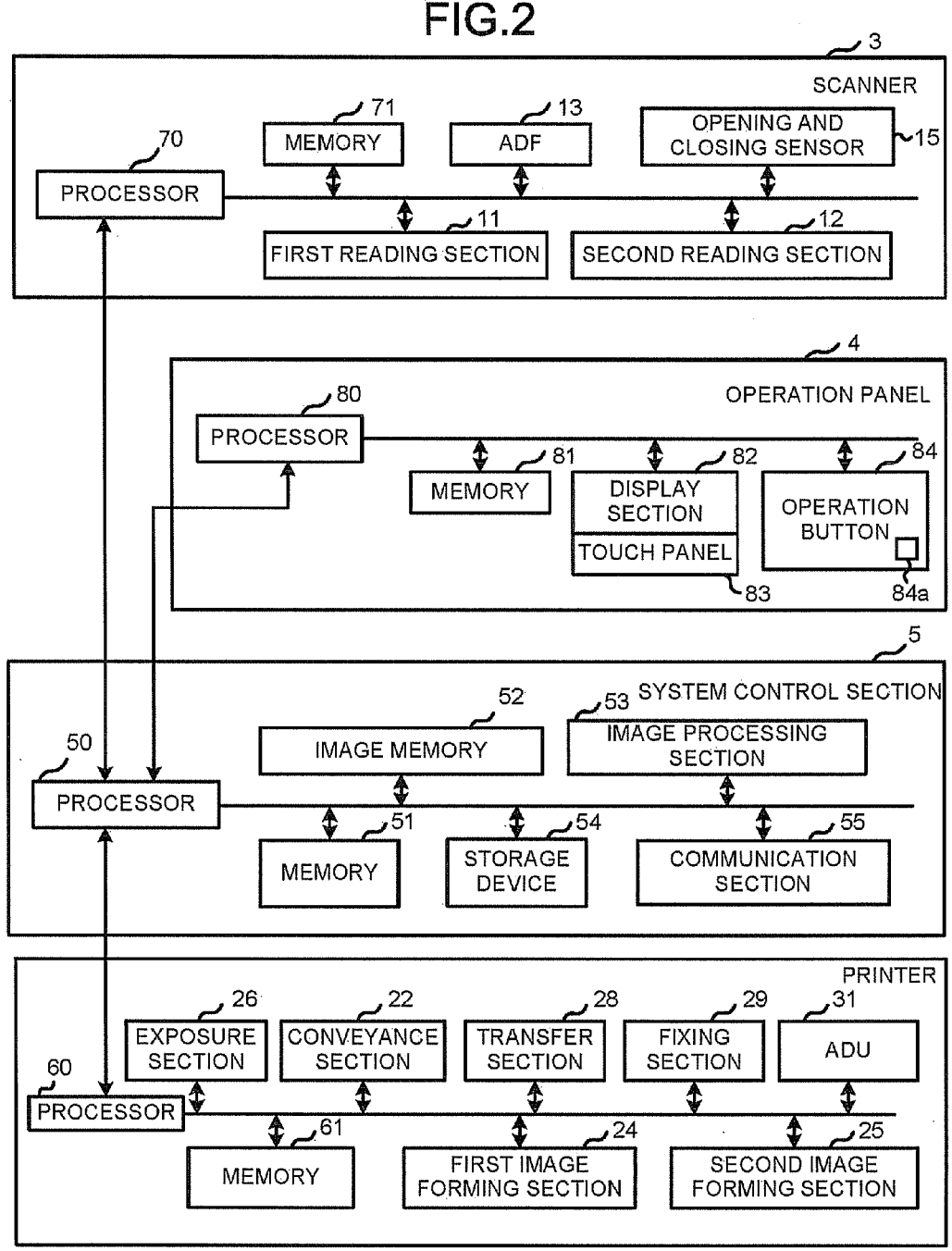
FIG. 2 is a block diagram illustrating an example of the configuration of a control system of the digital multi-functional peripheral according to the embodiment.

FIG. 2 is a block diagram schematically illustrating an example of the configuration of the control system in each section of the digital MFP.

In the example of the configuration shown in FIG. 2, the system control' section 5 includes a processor 50, a memory 51, an image memory 52, an image processing section 53, a storage device 54 and a communication section 55.

The processor 50 is connected with a processor of the scanner 3, a processor of the printer 2 and a processor of the operation panel 4 via an interface. The processor 50 realizes various processing functions by executing programs stored in the memory 51 or the storage device 54. For example, the processor 50 executes a program stored in the memory 51 to output an operation instruction to each section or acquire various kinds of information from each section. Furthermore, the processor 50 executes a program stored in the memory 51 to realize a processing such as an UV printing processing or an authenticity determination processing described later.

The memory 51 includes a memory such as a RAM (Random Access Memory), a ROM (Read Only Memory) and a data memory. The RAM functions as a working memory or a buffer memory. The ROM is a non-rewritable nonvolatile memory. The ROM functions as a program memory. The data memory is a rewritable non-volatile memory.

The image memory 52 stores the image data. For example, the image memory 52 functions as a page memory for copying or decompressing the image data serving as a processed object. The image processing section 53 processes the image data. For example, the image processing section 53 corrects, compresses or expands the image data.

The storage device 54 stores control data, a control program, setting information and the like. The storage device 54 is composed of, for example, a rewritable non-volatile memory. The storage device 54 may hold information for the UV printing described later.

The communication section 55 is an interface for carrying out data communication with an external device. The communication section 55 functions as an image acquisition section for acquiring a print image which should be printed on a medium as a visible image from the external device such as a PC. The communication section 55 also functions as an interface for communicating with a server described later. In other words, the communication section 55 also functions as an interface for acquiring information (authentication information for authenticity determination) which should be printed on a medium as an invisible image from the server described later.

Furthermore, the communication section 55 functions as first to fourth communication sections. The communication section 55 functioning as these communication sections may be composed of a plurality of interfaces. For example, the communication section 55 may be respectively equipped with a first interface for acquiring a print image from the external device and a second interface for communicating with the server.

Next, an example of the configuration of the control system in the printer 2 is described.

As shown in FIG. 2, the printer 2 includes a processor 60, a memory 61, the conveyance section 22, the first image forming section 24, the second image forming section 25, the exposure section 26, the transfer section 28, the fixing section 29 and the ADU 31.

The processor 60 realizes various processing by executing programs stored in the memory 61. For example, the processor 60 executes a program to carry out operation control of each section in the printer 2 and monitoring of an operation state of each section. The processor 60 is connected with the processor 50 of the system control section 5 via an interface. And in this way, the processor 60 executes a printing processing according to an operation instruction from the system control section 5.

The memory 61 includes a memory such as a RAM (Random Access Memory), a ROM (Read Only Memory) and a data memory. The RAM functions as a working memory or a buffer memory. The ROM is a non-rewritable nonvolatile memory. The ROM functions as a program memory. The data memory is a rewritable non-volatile memory.

The conveyance section 22 drives the conveyance roller arranged in each section in the printer 2 according to an operation instruction from the processor 60. The exposure section 26 emits the laser light for forming the electrostatic latent image to each of the photoconductive drums of the first image forming section 24 and the second image forming section 25 according to an operation instruction from the processor 60. The first image forming section 24 develops the electrostatic latent image formed on the photoconductive drum with the toner of each color according to an operation instruction from the processor 60. The second image forming section 25 develops the electrostatic latent image formed on the photoconductive drum with the UV toner according to an operation instruction from the processor 60.

The transfer section 28 transfers the toner image transferred onto the intermediate transfer belt 27 onto the sheet according to an operation instruction from the processor 60. The fixing section 29 drives the heat roller 29b and the pressurization section 29c according to an operation instruction from the processor 60. The heating section 29a of the fixing section 29 heats the surface temperature of the heat roller 29b to a desired fixing temperature according to the control of the processor 60. The fixing section 29 fixes the toner image transferred onto the sheet on the sheet in a state of being controlled at the fixing temperature. The ADU 31 inverts two sides of the sheet passing through the fixing section 29 to supply the inverted sheet again according to an operation instruction from the processor 60.

Next, an example of the configuration of the control system in the scanner 3 is described.

As shown in FIG. 2, the scanner 3 includes a processor 70, a memory 71, the first reading section 11, the second reading section 12, the ADF 13 and an opening and closing sensor 15.

The processor 70 realizes various processing by executing programs stored in the memory 71. For example, the processor 70 executes a program to carry out operation control of each section in the scanner 3 and monitoring of an operation state of each section. The processor 70 is connected with the processor 50 of the system control section 5 via an interface. And in this way, the processor 70 executes a scan processing according to an operation instruction from the system control section 5.

The memory 71 includes a memory such as a RAM (Random Access Memory), a ROM (Read Only Memory) and a data memory. The RAM functions as a working memory or a buffer memory. The ROM is a non-rewritable nonvolatile memory. The ROM functions as a program memory. The data memory is a rewritable non-volatile memory.

The first reading section 11 reads the image on the document surface with the visible light according to an operation instruction from the processor 70. For example, in a case of reading the visible image of the document on the document table glass 14, the first reading section 11 moves the reading position at a predetermined speed to read the visible image of the whole document through emitting the visible light. The second reading section 12 reads the image formed on the document surface with the UV toner as the fluorescence image according to an operation instruction from the processor 70. For example, in a case of reading the fluorescence image of the document on the document table glass 14, the second reading section 12 moves the reading position at a predetermined speed to read the fluorescence image of the whole document through emitting the invisible light (UV rays).

The ADF 13 conveys the documents one by one to the document reading position according to an operation instruction from the processor 70. For example, in a case in which the document set in the ADF 13 is read by the first reading section 11 and the second reading section 12, the ADF 13 conveys the document to pass through each of the document reading positions at a predetermined conveyance speed. The opening and closing sensor 15 detects an opening and closing state of the ADF 13 as the cover against the document table glass 14. For example, in a case in which the second reading section 12 reads the document, the processor 70 confirms that the ADF 13 is closed according to a detection signal of the opening and closing sensor 15.

Next, an example of the configuration of the control system in the operation panel 4 is described.

As shown in FIG. 2, the operation panel 4 includes a processor 80, a memory 81, a display section 82, a touch panel 83 and an operation button 84.

The processor 80 realizes various processing by executing programs stored in the memory 81. For example, the processor 80 executes a program to carry out operation control of each section in the operation panel 4 and monitoring of an operation state of each section. The processor 80 is connected with the processor 50 of the system control section 5 via an interface. For example, the processor 80 notifies the system control section 5 of the information input by the user.

The memory 81 includes a memory such as a RAM (Random Access Memory), a ROM (Read Only Memory) and a data memory. The RAM functions as a working memory or a buffer memory. The ROM is a non-rewritable nonvolatile memory. The ROM functions as a program memory. The data memory is a rewritable non-volatile memory.

A display content of the display section 82 is controlled according to an operation instruction from the processor 80. The touch panel 83 which is arranged on a display screen of the display section 82 detects a position touched on the display screen. For example, the processor displays an icon selectable with the touch panel 83 together with operation guidance on the display section 82. The processor 80 determines the information input by the user according to the touch position detected by the touch panel 83. The operation button 84 is composed of hard keys such as a start key and a reset key.

Next, an image forming system containing the digital MFP is described.

Figure 3:
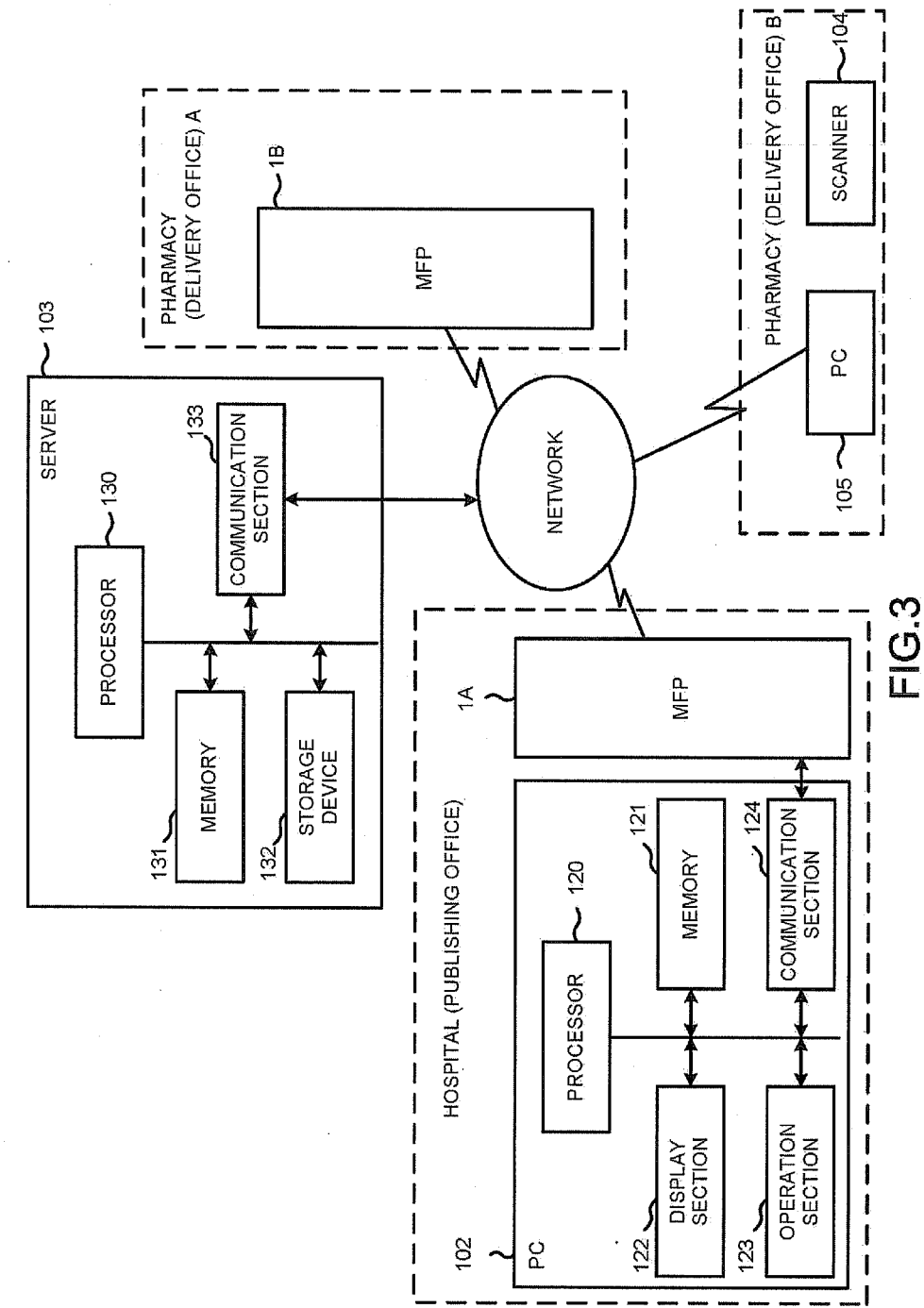
FIG. 3 is a block diagram illustrating an example of the configuration of an image forming system according to the embodiment.

FIG. 3 is a diagram illustrating an example of the configuration of the image forming system according to the embodiment.

The image forming system shown in FIG. 3 is a system (authenticity determination system of a printed matter) containing authenticity determination of a printed matter. The printed matter may be optional as long as the authenticity determination is necessary for the printed matter. In the present embodiment, the printed matter is assumed as a prescription slip, issued in a hospital, which is required for a prescription of medicine in a pharmacy to be described.

In the example of the configuration shown in FIG. 3, the image forming system includes a first digital MFP 1A, a PC 102, a server 103, a second digital MFP 1B, a scanner 104 and a PC 105.

The first MFP 1A and the PC 102 are arranged in a hospital (publishing office) that issues a prescription slip as a printed matter. There may be a plurality of the first MFPs 1A and a plurality of the PCs 102 in the hospital.

The first MFP 1A includes the foregoing configuration shown in FIG. 1 and FIG. 2. The first MFP 1A prints (issues) the prescription slip added with information for carrying out the authenticity determination. In other words, the first MFP 1A prints the information for carrying out the authenticity determination on the prescription slip with the UV toner which cannot be recognized with human eyes.

The PC 102 is a computer operated by a person who instructs printing of the prescription slip. In the example of the configuration shown in FIG. 3, the PC 102 includes a processor 120, a memory 121, a display section 122, an operation section 123 and a communication section 124.

The processor 120 realizes various processing by executing programs stored in the memory 121. For example, the processor 120 executes a program (printer driver) to instruct the printing of the prescription slip to the first MFP 1A.

The memory 121 includes a memory such as a RAM (Random Access Memory), a ROM (Read Only Memory) and a data memory. The RAM functions as a working memory or a buffer memory. The ROM is a non-rewritable nonvolatile memory. The ROM functions as a program memory. The data memory is a rewritable non-volatile memory.

A display content of the display section 122 is controlled according to an operation instruction from the processor 120. The operation section 123 is composed of a keyboard, a numeric keypad and a pointing device. Further, the operation section 123 may be a touch panel arranged on the display screen of the display section 122. The communication section 124 is an interface for communicating with the first MFP 1A.

The server 103 is connected with a network communicable with the first MFP 1A and the second MFP 1B. The server 103 manages information for authenticity determination to be printed on the prescription slip with the UV toner. In the example of the configuration shown in FIG. 3, the server 103 includes a processor 130, a memory 131, a storage device (storage section) 132 and a communication section 133.

The processor 130 realizes various processing by executing programs stored in the memory 131. For example, the processor 130 executes a program to instruct the information that should be used for the printing of the prescription slip to the first MFP 1A. Further, the processor 130 carries out the authenticity determination of the prescription slip on the basis of the information read by the first MFP 1A from the prescription slip (printed matter).

The memory 131 includes a memory such as a RAM (Random Access Memory), ROM (Read Only Memory) and a data memory. The RAM functions as a working memory or a buffer memory. The ROM is a non-rewritable nonvolatile memory. The ROM functions as a program memory. The data memory is a rewritable non-volatile memory.

The storage device 132 is a memory acting as a storage section for storing the information to be printed on the prescription slip with the UV toner as the information for authenticity determination. The communication section 133 is an interface for communicating with the first MFP 1A and the second MFP 1B via the network. The communication section 133 functions as a second communication section or a third communication section.

The second MFP 1B is arranged in a pharmacy (delivery office) A which delivers the medicine to a patient on the basis of the information recorded (printed) on the prescription slip as the printed matter. In the pharmacy, authenticity of the prescription slip is determined, and if it is determined that the prescription slip is genuine, the medicine recorded on the prescription slip is delivered to the patient. In the pharmacy, there may be a plurality of the second MFPs 1B.

The second MFP 1B includes the foregoing configuration shown in FIG. 1 and FIG. 2. The second MFP 1B reads a fluorescence image from the prescription slip received from the patient according to an operation of a person such as a chemist in the pharmacy A. The second MFP 1B determines the authenticity of the prescription slip on the basis of the fluorescence image read from the prescription slip. The second MFP 1B requests the server 103 to carry out the authenticity determination on the image read from the prescription slip and acquires an authenticity determination result from the server 103.

Further, in the example of the configuration shown in FIG. 3, the scanner 104 and the PC 105 are arranged in a pharmacy B. The MFP (MFP equipped with the UV scanner) with the configuration shown in FIG. 1 and FIG. 2 is arranged in the pharmacy B. Thus, the pharmacy B uses the scanner 104 to read an invisible image on the prescription slip and inquires a read result to the server 103 through the PC 105.

The scanner 104 sets the invisible image (image formed with the UV toner) on the printed matter serving as an authenticity determination object as a readable image. The scanner 104 may read the image formed with the UV toner as the fluorescence image. For example, the scanner 104 emits the UV rays to the prescription slip serving as the authenticity determination object to read the fluorescence image on the prescription slip. In this case, the scanner 104 supplies the read fluorescence image to the PC 105. The PC 105 sends the fluorescence image read by the scanner 104 to the server 103 and acquires an authentication processing result as a result of the authenticity determination from the server 103.

The scanner 104 may be an illumination device (for example, black light) for irradiating the printed matter serving as the authenticity determination object with light in a state in which the person can recognize the image formed with the UV toner with eyes. In this case, the PC 105 may input information (authentication information) contained in the image (fluorescence image) in a state of being visually recognizable by the scanner 104 as the illumination device by an operator. Further, the PC 105 may display the fluorescence image read by the scanner 104 on a display device or receive an input of the authentication information contained in the fluorescence image.

Next, operations of the image forming system constituted as stated above are described.

The first MFP 1A arranged in the hospital includes a print mode of printing a prescription slip (hereinafter, simply referred to as a prescription slip), delivered to the patient, on which information for authenticity determination is printed. The prescription slip is the printed matter on which the authentication information as the information for authenticity determination is printed with the UV toner. The first MFP 1A receives the printing of the prescription slip according to a print request from the PC 102 or an operation on the operation panel 4. If receiving the printing of the prescription slip, the first MFP 1A prints information of prescription drugs with the YMCK toner and prints the authentication information as the information for authenticity determination with the UV toner. In this way, the first MFP 1A issues the prescription slip on which the information of the drugs is printed as the visible image and the authentication information as the information for authenticity determination is printed as the invisible image.

Firstly, a print receiving processing of receiving the printing of the prescription slip by the first MFP 1A is described.

Figure 4:
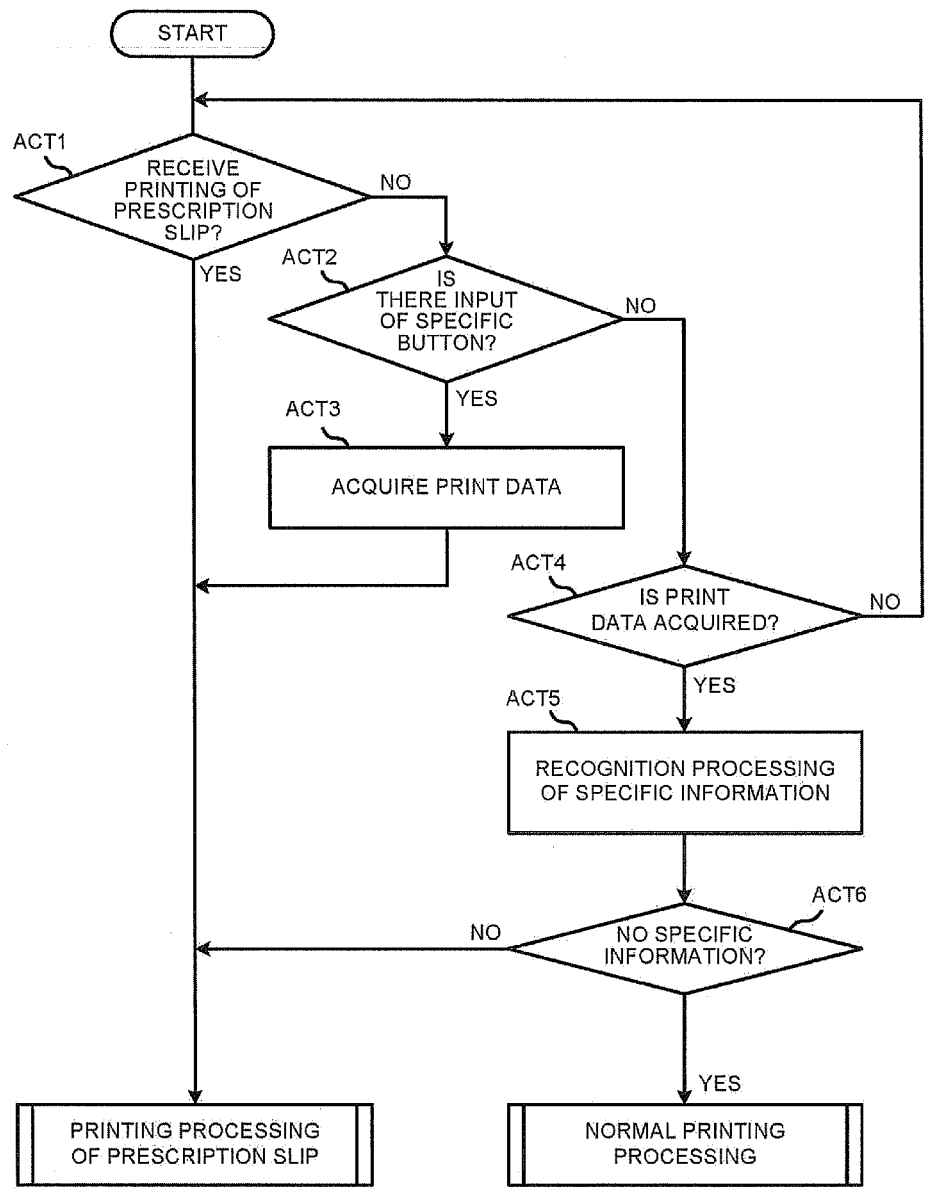
FIG. 4 is a flowchart illustrating a print receiving processing of a prescription slip by the digital multi-functional peripheral according to the embodiment.

FIG. 4 is a flowchart illustrating the print receiving processing of the prescription slip by the first MFP 1A.

If receiving the print request of the prescription slip from the PC 102 (YES in ACT 1), the system control section of the first MFP 1A receives the printing of the prescription slip. The processor 120 of the PC 102 executes the printer driver to send the print request of the prescription slip to the first MFP 1A. For example, an issuer (doctor or nurse) of the prescription slip designates contents (information of prescribed medicine) of the prescription slip to be printed on the PC 102 to start the printer driver. The contents of the prescription slip to be printed are information (visible information of the prescription slip) which should be printed on the prescription slip as the visible image.

The processor 120 of the PC 102 executes the printer driver as a program stored in the memory 121 to display a print setting screen on the display section 122. The issuer selects the printing of the prescription slip (UV printing of the authentication information) on the print setting screen to instruct execution of the printing. If the execution of the printing of the prescription slip is instructed, the processor 120 generates print data of the visible information of the prescription slip including the information of the prescribed medicine. The processor 120 sends the generated print image together with the print request of the prescription slip to the first MFP 1A. Through receiving the print request of the prescription slip from the PC 102, the processor 50 of the first MFP 1A receives the printing of the prescription slip to start the printing processing of the prescription slip.

A prescription slip print button (specific button) 84a for instructing the printing of the prescription slip is arranged on the operation panel 4 of the first MFP 1A. The specific button 84a instructs the printing of the prescription slip added with the authentication information for authenticity determination on the image of the document read by the scanner 3. The specific button 84a is a button for instructing a copy added with the authentication information for authenticity determination. The specific button 84a may be an icon selectable with the touch panel or one assignment of the hard keys acting as the operation button 84.

For example, in a case of setting a prescription slip (printed matter) without authentication information as the document and printing the prescription slip added with the authentication information, the issuer sets the document in the scanner 3 and presses the specific button 84a. If detecting an input to the specific button 84a (YES in ACT 2), the processor 50 of the system control section 5 reads the image of the document as the visible image to be printed on the prescription slip with the scanner 3 (ACT 3). The processor 50 of the system control section 5 prints the image read by the scanner 3 as the visible image and further starts the printing processing of the prescription slip on which the authentication information is printed as the invisible image.

The first MFP 1A identifies whether or not the acquired print data is the print image of the prescription slip, and if the acquired print data is the print image, of the prescription slip, the first MFP 1A may receive the printing of the prescription slip. The acquired print data may be data supplied from an external device such as the PC 102 or the image of the document read by the scanner 3. The processor 50 of the system control section 5 detects specific information for specifying the print image of the prescription slip from the acquired print data (ACT 5) if acquiring the print data (YES in ACT 4).

The specific information may be optional as long as the specific information can specify the print image of the prescription slip. For example, the specific information is a character string called "prescription slip". The processor 50 may detect print information of the invisible image (image with the UV toner) as the specific information. If the specific information can be detected (YES in ACT 6), the processor 50 carries out the printing processing of the prescription slip with the use of the acquired print data. On the contrary, if the specific information cannot be detected (No in ACT 6), the processor 50 executes a normal printing processing with the acquired print data.

According to the above processing, it is possible to receive the printing of the prescription slip including the processing of printing the authentication information for selecting the printing of the prescription slip as the invisible information through the printer driver. Further, according to the foregoing processing, it is possible to receive the print request from the PC through the printer driver.

Hereinafter, the operations of the image forming system according to the present embodiment are described.

Firstly, an issuing processing of the prescription slip by the image forming system is described.

Figure 5:
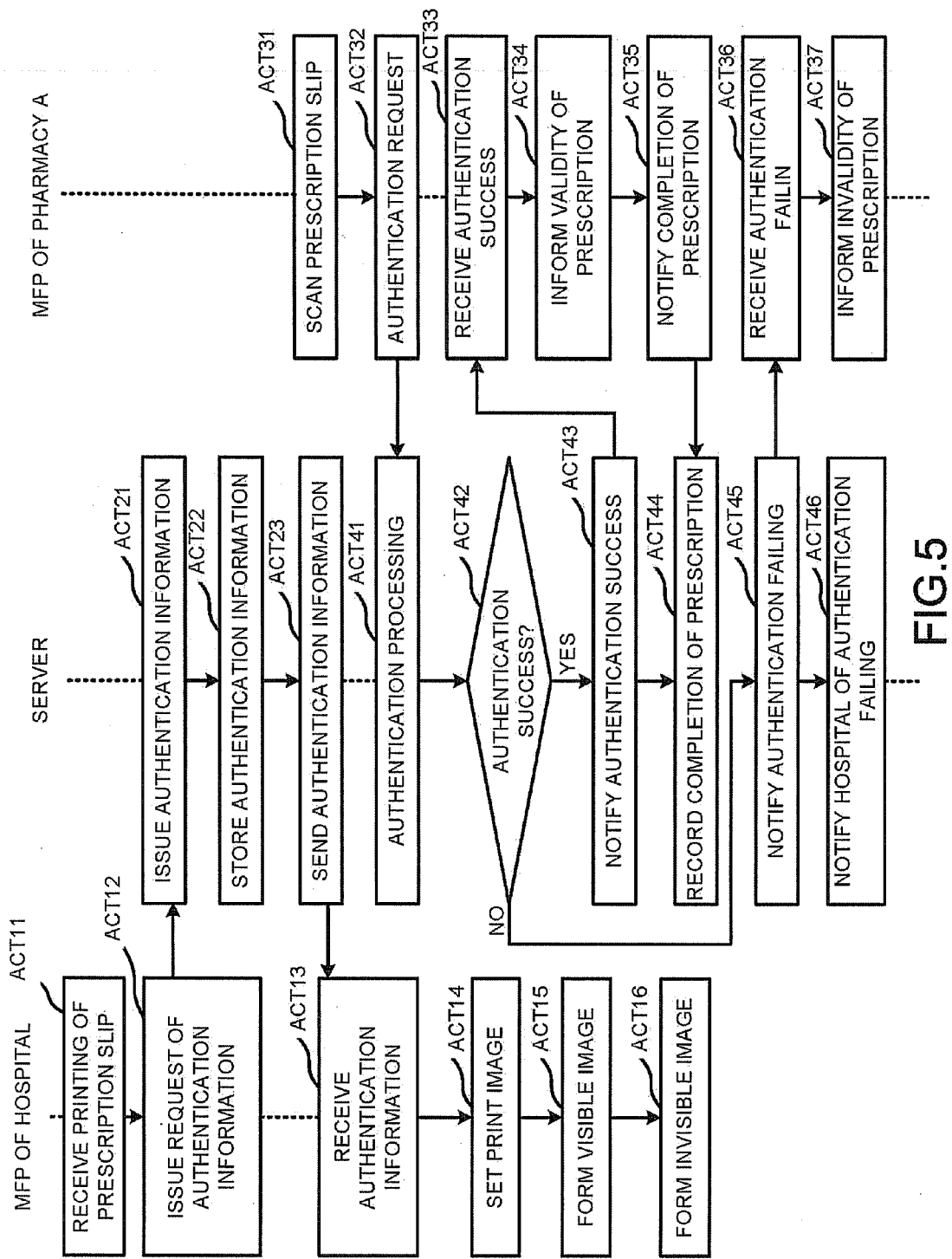
FIG. 5 is a sequence diagram illustrating the flow of a processing by the image forming system according to the embodiment.

FIG. 5 is a sequence diagram illustrating an example of the operations of the image forming system. In the sequence shown in FIG. 5, processing in ACTs 11-16 and ACTs 21-23 illustrates the flow of the issuing processing of the prescription slip.

In the hospital, the doctor decides the medicine prescribed to the patient on the basis of an examination result for the patient. Information indicating the medicine that the doctor decides to prescribe is input to the PC 102. The information indicating the medicine that the doctor decides to prescribe is information (visible information of the prescription slip) printed on the prescription slip as the visible image. The information indicating the medicine that the doctor decides to prescribe may be recorded in an image receiving medium such as a sheet which can be read by the scanner 3 of the first MFP 1A without going through the PC 102. For example, the sheet hand-written by the doctor may be set as the visible information of the prescription slip.

In other words, the first MFP 1A acquires the visible information of the prescription slip and receives the printing of the prescription slip (ACT 11) through the foregoing reception processing of the prescription slip. For example, the first MFP 1A receives the printing of the prescription slip through the visible information of the prescription slip received from the PC 102 or the visible information of the prescription slip read by the scanner 3 from the image receiving medium.

If receiving the printing of the prescription slip, the processor 50 of the first MFP 1A issues identification information for uniquely specifying the prescription slip to be issued. If the identification information of the prescription slip is issued, the processor 50 requests the server 103 to issue the information (authentication information) used in the authenticity determination of the prescription slip via the communication section 55 (ACT 12). For example, the processor 50 sends the identification number of the prescription slip and an issue request of the authentication information to the server 103.

The server 103 receives the issue request of the authentication information from the first MFP 1A through the communication section 133. If receiving the issue request of the authentication information, the processor 130 of the server 103 issues the authentication information (ACT 21). The authentication information is authentication information for authenticity determination of the prescription slip managed by the server 103. The authentication information may be information capable of being printed by the second image forming section 25 of the first MFP 1A with the UV toner as the image. For example, the authentication information for authenticity determination is generated by combining numbers, characters and marks. The authentication information may be issued randomly, set in advance or issued according to a predetermined rule. In the present embodiment, in consideration of application in the pharmacy B described later, the authentication information is assumed as an identification number composed of a number and characters capable of identifying the person.

If the authentication information is issued, the processor 130 stores the issued authentication information in the storage device 132 in association with the identification number of the prescription slip (ACT 22). The processor 130 may also store information such as information indicating an issue date and time and an issue request source in the storage device 132 in association with the issued authentication information. If the issued authentication information is stored in the storage device 132, the processor 130 sends the issued authentication information to the MFP 1A serving as the issue request source via the communication section 133 (ACT 23).

The first MFP 1A receives the authentication information from the server 103 through the communication section 55 (ACT 13) and if receiving the authentication information from the server 103, the processor 50 of the first MFP 1A carries out setting of the print image to be printed on the medium as the prescription slip (ACT 14). The first MFP 1A acquires the visible information of the prescription slip in the print receiving processing in ACT 11, and acquires the information (invisible information of the prescription slip) to be printed on the prescription slip as the invisible image from the server 103. The processor 50 sets the visible information of the prescription slip as print data with which an image is formed by the first image forming section 24 and the invisible information of the prescription slip as print data with which an image is formed by the second image forming section 25.

As the invisible information of the prescription slip is printed in an invisible state, it is possible to print the invisible information at any position on the medium on which the visible image is printed. In other words, as the invisible information of the prescription slip has no effect on visibility of the visible image, setting of printing the invisible information at any position on the prescription slip is possible. For example, the processor 50 sets a print position of the authentication information as the invisible image to a predetermined position on the medium regardless of the state of the visible image.

Further, in consideration of the configuration of the scanner 3 serving as a reading device of the prescription slip for the authenticity determination, the processor 50 may carry out the setting of the print image. For example, the scanner 3 may be a configuration in which, for the document conveyed by the ADF 13, the first reading section 11 reads the surface (first surface) of the document and the second reading section 12 reads the back surface (second surface) of the document. If the scanner 3 with such a configuration is a system which reads the prescription slip, the processor 50 may print the visible information on the surface and the invisible information (authentication information) on the back surface.

If the print images are set, the processor 50 executes the printing processing of the prescription slip with the printer 2 (ACT 15 and ACT 16). In the printing processing of the prescription slip, the processor 50 controls the printer 2 to print the invisible image on the visible image. In other words, the processor 50 carries out control in such a manner that the image with the UV toner is formed by the second image forming section 25 on the image formed with each toner of the YMCK by the first image forming section 24. For example, the processor 50 prints the invisible image (image formed with the UV toner) on the sheet with the second image forming section 25 after printing the visible image (image formed with the YMCK toner) on the sheet with the first image forming section 24. Further, the processor 50 may form an image on the intermediate transfer belt in such a manner that the image formed with the UV toner is rested on the image formed with the YMCK toner in a case of transferring the image onto the sheet.

The prescription slip printed by the first MFP 1A through the printing processing of the prescription slip is handed over to the patient (receiver of the medicine), and an issue procedure of the prescription slip is ended. In the prescription slip printed by the first MFP 1A, as the invisible image is printed on the visible image, the invisible image can be confirmedly read by the scanner 3. Further, in the prescription slip printed by the first MFP 1A, as the invisible image does not make the visible image difficult to see, the visibility of the visible image is also kept fine.

According to the foregoing processing, the MFP as the image forming apparatus according to the embodiment carries out the issuing (acquisition) processing of the authentication information if receiving the printing of the prescription slip. The MFP prints the acquired authentication information on the prescription slip as the invisible image if acquiring the authentication information. In this way, according to the embodiment, the authentication information can be printed on the prescription slip in the invisible state and duplication of the prescription slip can be prevented.

Further, in the image forming system according to the embodiment, the MFP requests the server to issue the authentication information. The server issues the authentication information according to the issue request from the MFP. Further, the server stores the issued authentication information in the storage section. In this way, through issuing and managing the authentication information with the server, security of the authentication information can be increased.

Next, a prescription procedure of the medicine based on the prescription slip (delivery of an article based on a printed matter) is described.

In the sequence shown in FIG. 5, processing in ACTs 31-36 and ACTs 41-45 indicates the prescription (delivery) procedure of the medicine based on the prescription slip.

The patient (or an agent of the patient) who receives the prescription slip in the hospital presents the prescription slip in the pharmacy. A case in which the prescription slip is presented in the pharmacy A in which the MFP (second MFP) 1B with the configuration shown in FIG. 2 is arranged is described.

The prescription slip received from the patient in the pharmacy A is set in the scanner 3 of the second MFP 1B. In the second MFP 1B in which the prescription slip is set, reading of the prescription slip (authenticity determination of the prescription slip) is instructed on the operation panel 4. If the reading of the prescription slip is instructed, the processor 50 of the second MFP 1B scans the prescription slip with the second reading section 12 of the scanner 3 (ACT 31). The second reading section 12 scans the prescription slip to read the invisible image printed on the prescription slip as the fluorescence image.

If the authentication information (invisible image) is printed in a predetermined area of the prescription slip, the second reading section 12 may read an area including a print area of the authentication information. For example, if the visible image is printed on the first surface of the prescription slip and the invisible image is printed on the second surface thereof, the processor 50 controls the second reading section 12 to read the second surface of the prescription slip.

If the second reading section 12 reads the fluorescence image (visualized invisible image) from the prescription slip, the processor 50 sends the read fluorescence image together with an authentication request to the server 103 (ACT 32). Furthermore, the processor 50 may send the identification information of the prescription slip together with the authentication request to the server 103. In this case, the identification information of the prescription slip may be recognized from the visible image of the prescription slip read by the first reading section 11 of the scanner 3 or input through the operation panel 4.

The server 103 receives the authentication request from the second MFP 1B through the communication section 133.

If receiving the authentication request, the processor 130 of the server 103 carries out the authentication processing on the received fluorescence image together with the authentication request (ACT 41). The processor 130 recognizes the authentication information from the received invisible image. For example, if the authentication information is character information, the processor 130 carries out character recognition on the received fluorescence image to acquire the authentication information. Further, in a case in which the authentication information is printed with a bar code, the processor 130 extracts the bar code from the fluorescence image and decodes the extracted bar code to acquire the authentication information. If receiving the authentication information from the fluorescence image, the processor 130 carries out an authentication processing based on collation between the acquired authentication information and the issued authentication information stored in the storage section. The authentication processing is not limited to the collation between the acquired authentication information and the issued authentication information and can apply various authentication methods.

If the authentication is successful (YES in ACT 42), the processor 130 notifies the second MFP 1B serving as the authentication request source of the authentication success (ACT 43). The second MFP 1B receives the notification of the authentication success from the server 103 through the communication section 55 (ACT 33). If receiving the notification of the authentication success, the processor 50 of the second MFP 1B informs a message indicating that the authentication is successful or a message indicating that the prescription slip is valid (ACT 34). For example, the processor 50 displays the message indicating that the authentication of the prescription slip is successful or the message indicating that the prescription slip is valid on the display section 82 of the operation panel 4. In a case in which the message indicating that the authentication is successful is informed, in the pharmacy, the medicine is prescribed on the basis of the prescription slip, and the prescribed medicine is handed over to the patient.

After delivering the medicine based on the prescription slip to the patient, the processor 50 of the second MFP 1B notifies the server 103 of the information (prescribed information) indicating the prescribed prescription slip (ACT 35). If receiving the prescribed information, the processor 130 of the server 103 stores information indicating the completion of the prescription in the storage section in association with the authentication information of the prescribed prescription slip (ACT 44). The processor 130 may delete the authentication information of the prescribed prescription slip from the storage section. Through the processing, it can be prevented that the medicine is prescribed again on the basis of the prescribed prescription slip.

If the authentication is failed (No in ACT 42), the processor 130 notifies the second MFP 1B of the authentication failing (ACT 45). On the contrary, the second MFP 1B receives the notification of the authentication failing from the server 103 through the communication section 55 (ACT 36). If receiving the notification of the authentication failing, the processor 50 of the second MFP 1B informs a message indicating that the authentication on the scanned prescription slip is failed or a message indicating that the prescription slip is invalid (ACT 37). For example, the processor 50 displays the message indicating that the authentication of the prescription slip is failed or the message indicating that the prescription slip is invalid on the display section 82 of the operation panel 4. In a case in which the message indicating that the authentication is failed is informed, the pharmacy refuses the prescription of the medicine based on the prescription slip.

If the authentication is failed (No in ACT 42), the processor 130 of the server 103 also notifies the hospital of the authentication failing (ACT 46). Through also notifying the hospital that the authentication is failed, in the hospital, the prescription slip of which the prescription is not completed (the prescription slip of which the authentication is failed) can be grasped. Further, in the hospital which receives the notification of the message indicating that the authentication is failed, an inquiry relating to the prescription slip on which the prescription is invalid from the pharmacy can also be smoothly handled.

According to the foregoing processing, the MFP arranged in the pharmacy scans the prescription slip with the UV scanner capable of reading the image formed with the UV toner. The MFP sends the image scanned by the UV scanner to the server. The server carries out the authentication processing according to the information included in the image scanned by the UV scanner of the MFP and the issued authentication information stored in the storage section to notify the authentication result to the MFP. The MFP informs validity of the prescription slip on the basis of the authentication result from the server. In this way, in the pharmacy in which the MFP is arranged, the authenticity of the prescription slip can be determined through the scanning on the prescription slip by the MFP. As a result, it is possible that the image forming system according to the present embodiment prevents unfair use of the prescription slip.

Next, the prescription procedure (delivery of the article based on the printed matter) of the medicine based on the prescription slip in the pharmacy B in which the MFP equipped with the second reading section (UV scanner) 12 is not arranged is described.

Figure 6:
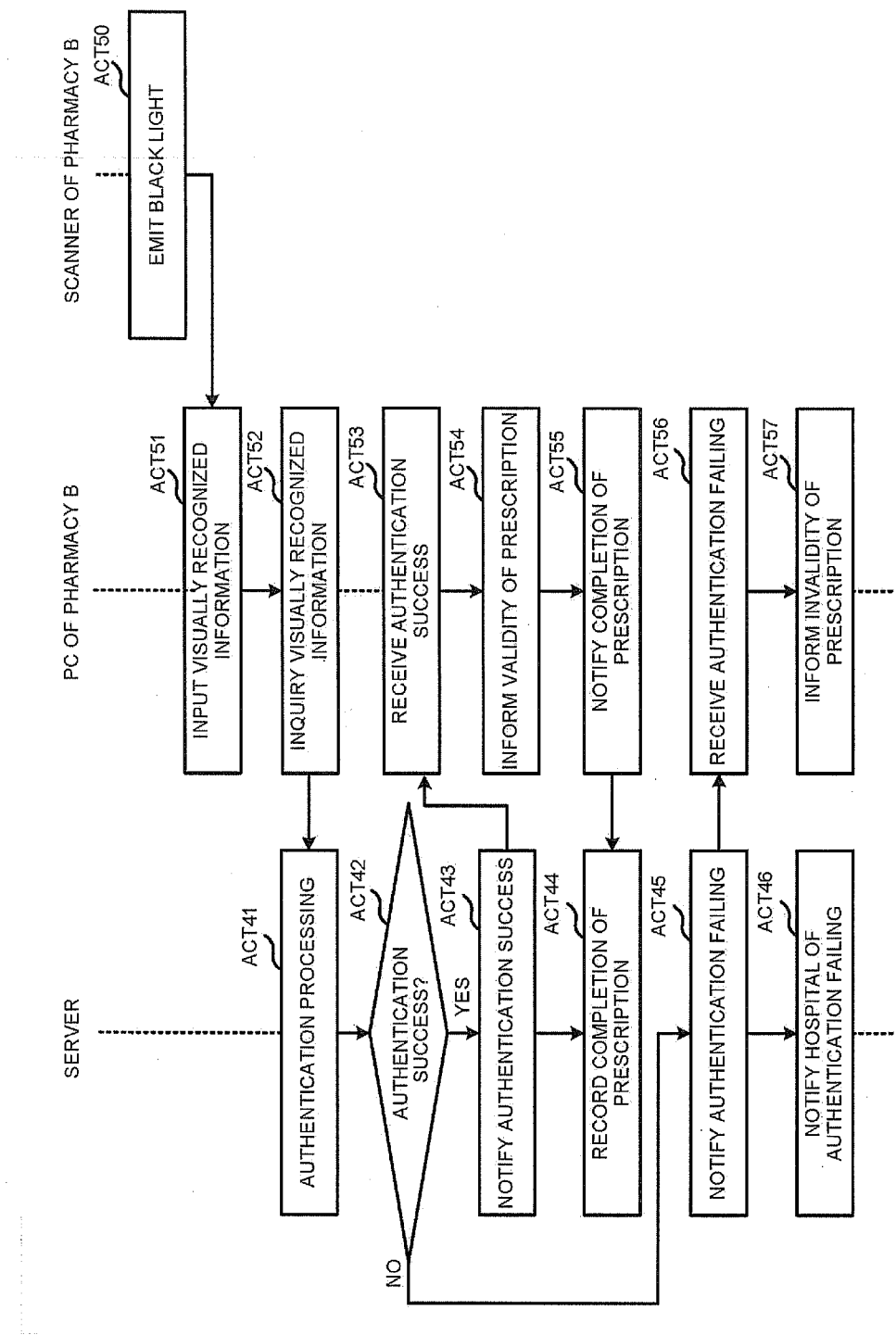
FIG. 6 is a sequence diagram illustrating the flow of authenticity determination in a pharmacy in which the digital multi-functional peripheral is not arranged in the image forming system according to the embodiment.

FIG. 6 is a sequence diagram illustrating the prescription procedure of the medicine in the pharmacy B in which the MFP equipped with the second reading section (UV scanner) 12 is not arranged.

In the pharmacy B, the prescription slip received from the patient is irradiated with the black light of the scanner 104. On the prescription slip irradiated with the black light, the authentication information formed with the UV toner appears as the fluorescence image. The pharmacy B inquires of the server 103 about the authentication information read from the fluorescence image with the PC 105 or another information transmission means. The authenticity of the prescription slip is determined by inquiring of the server 103 about the information which can be visually recognized as the fluorescence image with the PC 105.

In other words, in the pharmacy B, the prescription slip is irradiated with the black light (ACT 50). The information (invisible information) of the fluorescence image appearing on the prescription slip irradiated with the black light is input to the PC 105 by the operator (ACT 51). The PC 105 communicates with the server 103 via a communication line to request the server 103 to inquire (authenticate) the information input by the operator (ACT 52).

The server 103 executes the authentication processing according to the inquiry from the PC 105 (ACT 41). The processor 130 of the server 103 collates information obtained by receiving the inquiry from the PC 105 and the issued authentication information stored in the storage device 132 as the authentication processing. In other words, the processor. 130 of the server 103 determines authentication success if the authentication information coincident with the information obtained by receiving the inquiry from the PC 105 is stored in the storage device 132. On the contrary, the processor 130 of the server 103 determines authentication failing if no authentication information coincident with the information obtained by receiving the inquiry from the PC 105 is stored in the storage device 132.

If the authentication is successful (YES in ACT 42), the server 103 notifies the PC 105 of the authentication success (ACT 43). If receiving the authentication (inquiry) success from the server 103 (ACT 53), the PC 105 informs a message indicating that the authentication is successful or a message indicating that the prescription slip is valid (ACT 54). For example, the PC 105 displays the message indicating that the authentication of the prescription slip is successful or the message indicating that the prescription slip is valid on the display device. In a case in which the message indicating that the authentication is successful is informed, in the pharmacy B, the medicine is prescribed on the basis of the prescription slip, and the prescribed medicine is handed over to the patient. After delivering the medicine based on the prescription slip to the patient, the PC 105 may notify the server 103 of the prescribed information (ACT 55). If receiving the prescribed information, the processor 130 of the server 103 stores the information indicating the completion of the prescription in the storage section in association with the authentication information of the prescribed prescription slip (ACT 44).

If the authentication is failed (No in ACT 42), the processor 130 of the server 103 notifies the PC 105 of the authentication failing (ACT 45). If the authentication fails (No in ACT 42), the processor 130 of the server 103 may also notify the hospital of the authentication failing (ACT 46).

If receiving the notification of the authentication failing from the server 103 (ACT 56), the PC 105 informs a message indicating that the authentication on the prescription slip is failed or a message indicating that the prescription slip is invalid (ACT 57). For example, the PC 105 displays the message indicating that the authentication of the prescription slip is failed or the message indicating that the prescription slip is invalid on the display device. In a case in which the message indicating that the authentication is failed is informed, the pharmacy refuses the prescription of the medicine based on the prescription slip.

According to the above processing, even in the pharmacy in which the MFP including the function of reading the image formed with the UV toner is not arranged, it is possible to carry out the authenticity determination of the prescription slip. Thus, the image forming system according to the present embodiment can also be applied in the pharmacy in which the MFP including the UV scanner is not arranged. As a result, it is possible that the image forming system according to the present embodiment prevents the unfair use of the prescription slip without increasing burdens of the pharmacy due to introducing the system.

In the digital MFP as the image forming apparatus according to the embodiment, the prescription slip which can prevent unfair duplication or forgery of the prescription slip (printed matter) can be issued. Further, in the image forming system according to the embodiment, availability of the prescription of the medicine is conformed through the authenticity determination on the prescription slip (printed matter). In this way, in the image forming system according to the embodiment, unfair prescription of medicines (sleeping pills, tranquilizers or sedatives and the like) according to an unfair prescription slip can be prevented.

The function of the server 103 in the foregoing embodiment may be included in the MFP 1. For example, the first MFP 1A arranged in the hospital may include the function of the server 103. In this case, the first MFP 1A may execute the processing in ACTs 12-13 and ACTs 21-23 shown in FIG. 5 as the issuing processing of the authentication information and may execute the processing in ACTs 41-46 shown in FIG. 5 as the authentication processing. The foregoing image forming system can be constructed by holding the function of the server 103 in the first MFP 1A.

Other than in the operating examples, or where otherwise indicated, all numbers, values and/or expressions referring to parameters, measurements, conditions, etc., used in the specification and claims are to be understood as modified in all instances by the term "about."

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming system, comprising: an image forming apparatus and a server,
    the image forming apparatus comprises:
        a first interface configured to communicate with the server;
        a first printer configured to form an image with a visible image forming material;
        a second printer configured to form an image with an invisible image forming material; and
        a processor configured to acquire a print image that should be printed on a medium to be issued as a printed matter and authentication information for authenticity determination added to the printed matter and carry out an image forming processing on the print image with the visible image forming material by the first printer the authentication information with the invisible image forming material by the second printer,
    the server, comprises:
        a second interface configured to communicate with the image forming apparatus; and
        a processor configured to issue the authentication information in a case of receiving an issue request of the authentication information for authenticity determination from the image forming apparatus through the second interface and sends the issued authentication information to the image forming apparatus through the second interface.

2. The image forming system according to claim 1, wherein
    the server further comprises a storage configured to store the authentication information sent to the image forming apparatus through the second interface, and a third interface configured to communicate with an external device; and
    in a case of receiving a read result of the image formed with the invisible image forming material on the printed matter serving as an authenticity determination object through the third interface, the processor of the server carries out an authentication processing on the printed matter serving as the authenticity determination object on the basis of the read result and the authentication information stored in the storage.

3. The image forming system according to claim 2, further comprising
an image reading device, comprising:
a scanner configured to read the image formed with the invisible image forming material on the printed matter serving as the authenticity determination object; and
a fourth interface configured to communicate with the server, wherein
the third interface of the server is an interface configured to communicate with the image reading device; and
in a case of receiving a read result of the printed matter serving as an authenticity determination object by the scanner from the image reading device through the third interface, the processor of the server carries out an authentication processing on the printed matter serving as the authenticity determination object on the basis of the read result and the authentication information stored in the storage and notifies the image reading device of a recognition processing result through the third interface.

4. The image forming system according to claim 1, wherein
the processor of the image forming apparatus executes a recognition processing for detecting specific information for determining whether or not the authentication information is added to the print image, acquires the authentication information in a case in which the specific information is detected, and does not acquire the authentication information in a case in which the specific information is not detected.

5. The image forming system according to claim 1 wherein the image forming apparatus further comprises a storage configured to store the authentication information, and a third interface configured to communicate with an external device, and
wherein in a case of receiving a read result of the image formed with the invisible image forming material on the printed matter serving as an authenticity determination object through the third interface, the processor of the image forming apparatus carries out an authentication processing on the printed matter serving as the authenticity determination object on the basis of the read result and the authentication information stored in the storage.

6. The image forming system according to claim 1, wherein the processor of the image forming apparatus is configured to carry out simultaneously the image forming processing on the print image with the visible image forming material by the first printer and the authentication information with the invisible image forming material by the second printer.

7. The image forming system according to claim 1, wherein the processor of the image forming apparatus is configured to carry out in sequence the image forming processing on the print image with the visible image forming material by the first printer and then the authentication information with the invisible image forming material by the second printer.

8. An image forming system, comprising: an image forming apparatus and a server,
the image forming apparatus comprises:
a first interface configured to communicate with the server;
a first printer configured to form an image with a visible image forming material;
a second printer configured to form an image with an invisible image forming material;
a specific button configured to instruct printing added with the authentication information for authenticity determination on the print image;
a scanner configured to read a visible image of a document as the print image; and
a processor configured to set the visible image of the document read by the scanner as the print image in a case in which the specific button is instructed, acquire authentication information for authenticity determination added to the printed matter and carry out an image forming processing on the print image with the visible image forming material by the first printer the authentication information with the invisible image forming material by the second printer;
the server, comprises:
a second interface configured to communicate with the image forming apparatus; and
a processor configured to issue the authentication information in a case of receiving an issue request of the authentication information for authenticity determination from the image forming apparatus through the second interface and sends the issued authentication information to the image forming apparatus through the second interface.

9. The image forming system according to claim 8, wherein
the server further comprises a storage configured to store the authentication information sent to the image forming apparatus through the second interface, and a third interface configured to communicate with an external device; and
in a case of receiving a read result of the image formed with the invisible image forming material on the printed matter serving as an authenticity determination object through the third interface, the processor of the server carries out an authentication processing on the printed matter serving as the authenticity determination object on the basis of the read result and the authentication information stored in the storage.

10. The image forming system according to claim 9, further comprising
an image reading device, comprising:
a scanner configured to read the image formed with the invisible image forming material on the printed matter serving as the authenticity determination object; and
a fourth interface configured to communicate with the server, wherein
the third interface of the server is an interface configured to communicate with the image reading device; and
in a case of receiving a read result of the printed matter serving as an authenticity determination object by the scanner of the image reading device, the processor of the server carries out an authentication processing on the printed matter serving as the authenticity determination object on the basis of the read result and the authentication information stored in the storage and notifies the image reading device of a recognition processing result through the third interface.

11. The image forming system according to claim 8, wherein the processor of the image forming apparatus executes a recognition processing for detecting specific information for determining whether or not the authentication information is added to the print image, acquires the authentication information in a case in which the specific information is detected, and does not acquire the authentication information in a case in which the specific information is not detected.

12. The image forming system according to claim 8, wherein the image forming apparatus further comprises a storage configured to store the authentication information, and a third interface configured to communicate with an external device; wherein in a case of receiving a read result of the image formed with the invisible image forming material on the printed matter serving as an authenticity determination object through the third interface, the processor of the image forming apparatus carries out an authentication processing on the printed matter serving as the authenticity determination object on the basis of the read result and the authentication information stored in the storage.

13. The image forming system according to claim 8, wherein the processor of the image forming apparatus is configured to carry out simultaneously the image forming processing on the print image with the visible image forming material by the first printer and the authentication information with the invisible image forming material by the second printer.

14. The image forming system according to claim 8, wherein the processor of the image forming apparatus is configured to carry out in sequence the image forming processing on the print image with the visible image forming material by the first printer and then the authentication information with the invisible image forming material by the second printer.

* * * * *